United States Patent [19]

Briscoe

[11] Patent Number: 4,538,269
[45] Date of Patent: Aug. 27, 1985

[54] PROGRAMMABLE CODING AND DECODING ARRANGEMENT

[75] Inventor: Milton R. Briscoe, Raleigh, N.C.

[73] Assignee: International Telephone and Telegraph Corporation, New York, N.Y.

[21] Appl. No.: 485,988

[22] Filed: Apr. 18, 1983

[51] Int. Cl.³ .............................................. G06F 11/02
[52] U.S. Cl. ......................................... 371/22; 371/15
[58] Field of Search ........................ 364/200, 900, 579; 371/22, 15, 71, 24, 25

[56] References Cited

U.S. PATENT DOCUMENTS

| | | | |
|---|---|---|---|
| 3,920,973 | 11/1975 | Avellan et al. | 364/579 |
| 4,012,625 | 3/1977 | Bowen et al. | 371/20 |
| 4,279,032 | 7/1981 | Smith | 371/24 |
| 4,376,999 | 3/1983 | Abbott et al. | 371/71 |
| 4,402,055 | 8/1983 | Lloyd et al. | 371/20 |
| 4,441,183 | 4/1984 | Dussault | 371/25 |
| 4,476,561 | 10/1984 | Baackmann et al. | 371/25 |

Primary Examiner—Michael R. Fleming
Attorney, Agent, or Firm—John T. O'Halloran; Peter R. Ruzek

[57] ABSTRACT

A coding and decoding arrangement situated between and connected to digital and analog telecommunication lines includes a plurality of signal processing components which are arranged in respective receive and transmit paths and which process incoming digital signals and convert them into analog signals, and convert outgoing analog signals into digital signals and process the latter. A plurality of multiplexers is provided, each arranged ahead of one of the components in the respective receive and transmit path, and having respective test paths connected thereto. The multiplexers can be switched by control signals such as to selectively form test routes through the arrangement, each test route including a different combination of the components, so that testing signals can be sent through such components via the test routes for testing the performances of such components. An additional multiplexer is arranged at the ends of the test routes and is operative for selectively connecting such test routes to an output of the arrangement. The control signals are applied to control inputs of the multiplexers and selected combinations thereof are stored in respective memory locations of a test memory, to be called therefrom upon addressing of the respective memory location. The memory locations of the test memory are addressed by a test latch which is connected to a data bus carrying the respective address of the memory location to be addressed. The test latch is enabled by a signal issued by an externally controlled address decoder.

16 Claims, 3 Drawing Figures

PROGRAMMABLE CODING AND DECODING ARRANGEMENT

BACKGROUND OF THE INVENTION

The present invention relates to programmable coding and decoding arrangements in general, and more particularly to an arrangement of the above type which is situated between and connected to digital and analog telecommunication lines.

In the field of telecommunications, use of digital signalling techniques in transmitting information over long distances is gaining more and more prominence, even for audio transmission. On the other hand, the subscriber lines between the central office or local exchange and the subscriber equipment are usually operated in an analog fashion. Therefore, it is necessary to interpose a coding and decoding arrangement between the digitally operated main lines and the analog subscriber lines. Such coding and decoding arrangements perform digital filtering, analog-to-digital and digital-to-analog conversion, and often also echo suppression operations. Each of the coding and decoding arrangements of the above type typically includes a plurality of signal processing components which perform the above-mentioned tasks and which are usually arranged in two separate paths, one for the processing of the incoming signals, and one for the processing of the outgoing signals.

With an increased sophistication of the coding and decoding arrangements, there is an increasing need for testing the preformance of the various signal processing components, so as to assure proper functioning of the arrangement. So, for instance, there are already known arrangements of the above type in which it is possible to set the digital filter coefficients in dependence on the conditions prevailing in the subscriber line, on the signal strength or on other parameters. In this manner, the transfer functions of the digital filters may be changed when the above parameters change and thereby the quality of the message signal rendition is improved. Under such circumstances, it is desirable to be able not only to test the components for their integrity and performance of their intended function, but also to determine the instantaneous values of the coefficients. For this reason, there have already been developed various testing arrangements of greater or lesser sophistication for use in testing the coding and decoding arrangements. However, experience with these conventional testing arrangements has shown that they are either too complex and hence expensive, requiring a substantial amount of additional hardware outside the semiconductor chip carrying the coding and decoding arrangement, or do not perform all of the testing and information gathering tasks which are needed for assuring satisfactory performance of the coding and decoding arrangement.

SUMMARY OF THE INVENTION

Accordingly, it is a general object of the present invention to avoid the disadvantages of the prior art.

More particularly it is an object of the present invention to provide a coding and decoding arrangement situated between digital and analog telecommunication lines which does not possess the disadvantages of the conventional arrangements of this type.

Another object of the present invention is so to design the arrangement of the type here under consideration as to require a very low amount of relatively inexpensive additional hardware located outside the coding and decoding chip for the purposes of operating and testing the various components thereof.

A concomitant object of the invention is to devise an arrangement of the above type which is simple in construction, inexpensive to manufacture, easy to use, and reliable in operation nevertheless.

In pursuance of these objects and others which will become apparent hereafter, one feature of the present invention is embodied in a coding and decoding arrangement situated between and connected to digital and analog telecommunication lines. This arrangement comprises means for forming a first path for incoming, and a separate second path for outgoing, digital signals, first and second signal processing means each including a plurality of testable components respectively interposed in the first and second paths, and means for testing these components. The testing means includes means for issuing testing signals, means for forming testing path bypassing at least some of the components within and between the first and second paths, switching means, especially multiplexers, interposed in the first and second paths ahead of at least some of the components as considered in the direction of propagation of the respective incoming and outgoing digital signals and between the first and second paths and the respective testing paths and operative for selectively switching between these paths, and means for so controlling the operation of the switching means as to provide a plurality of testing routes for the testing signals, each route incorporating a different combination of the components.

A particular advantage of this approach is that it is possible easily to provide at least most of the testing means on a common chip with the components and connections of the signal processing part of the coding and decoding arrangement. In this manner, the cost of the testing means is reduced to a minimum.

BRIEF DESCRIPTION OF THE DRAWING

Above-mentioned and other features and objects of this invention will become more apparent by reference to the following description taken in conjuction with the accompanying drawings in which.

DETAILED DESCRIPTION OF THE PREFERRED EMBODIMENT

Figure 1:
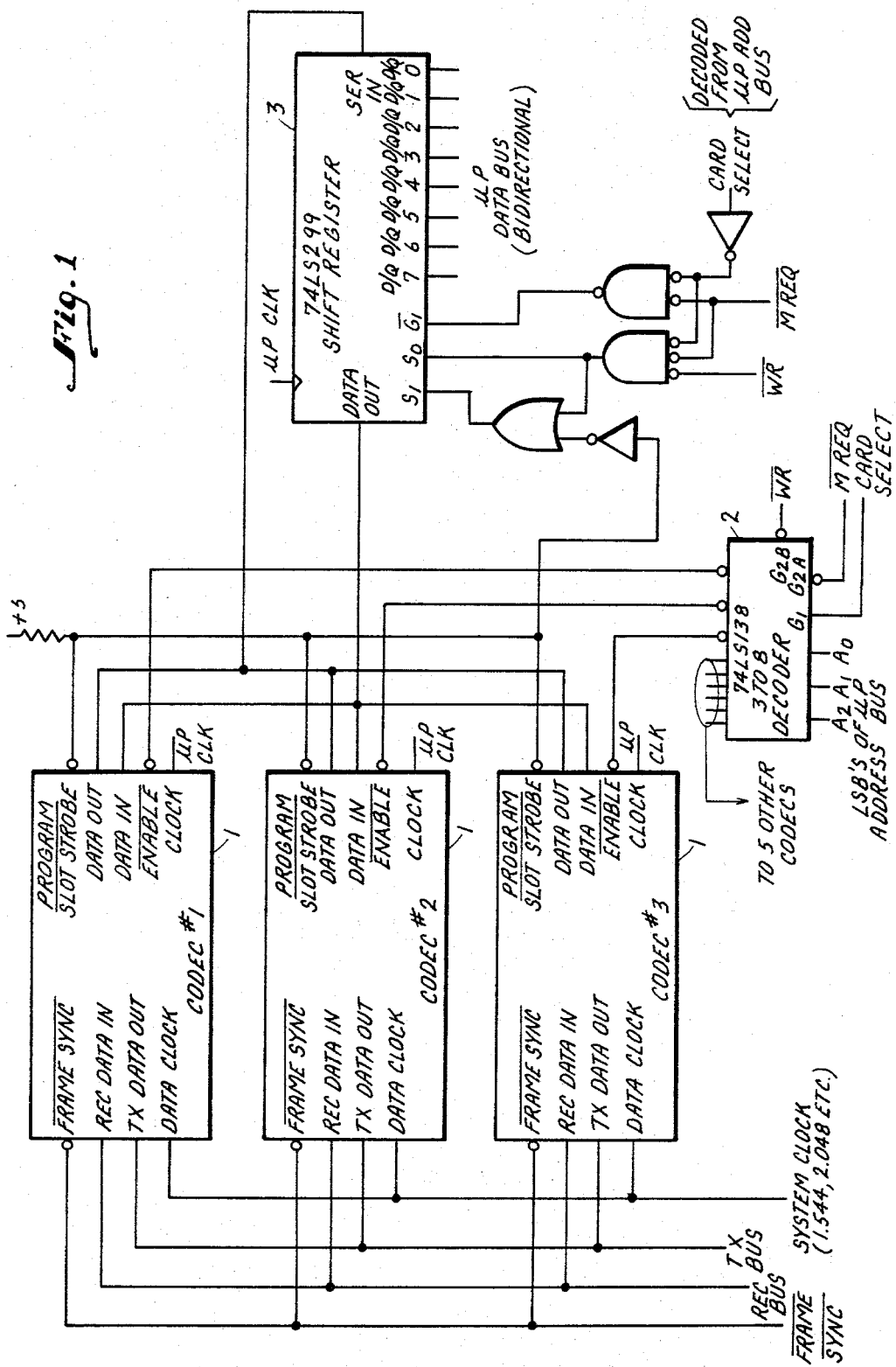
FIG. 1 is a diagrammatic view of a group of coding and decoding arrangements of the present invention with additional hardware as located at a telephone exchange.

Referring now to the drawing in detail, and first to FIG. 1 thereof, it may be seen that the reference numeral 1 has been used therein to identify a programmable coding and decoding arrangement of a present invention in its entirety. As shown, three of the coding and decoding arrangements 1 are provided in parallel to one another but it will be appreciated that typically a large number of the arrangements 1 will be present at the respective telephone exchange. Each of these coding and decoding arrangements 1 is associated with a different subscriber line. A selecting multiplexer 2 is provided which selects the arrangement 1 to be tested by changing the voltage level at the respective enable input of the selected arrangement 1. The illustrated selecting multiplexer 2 is capable of handling up to eight of the arrangements 1, which may be arranged on a common card. A shift register 3 controlled by a logic circuitry 4 has a data output which is connected by a line 46 to a data input of each of the arrangements 1.

Figure 2:
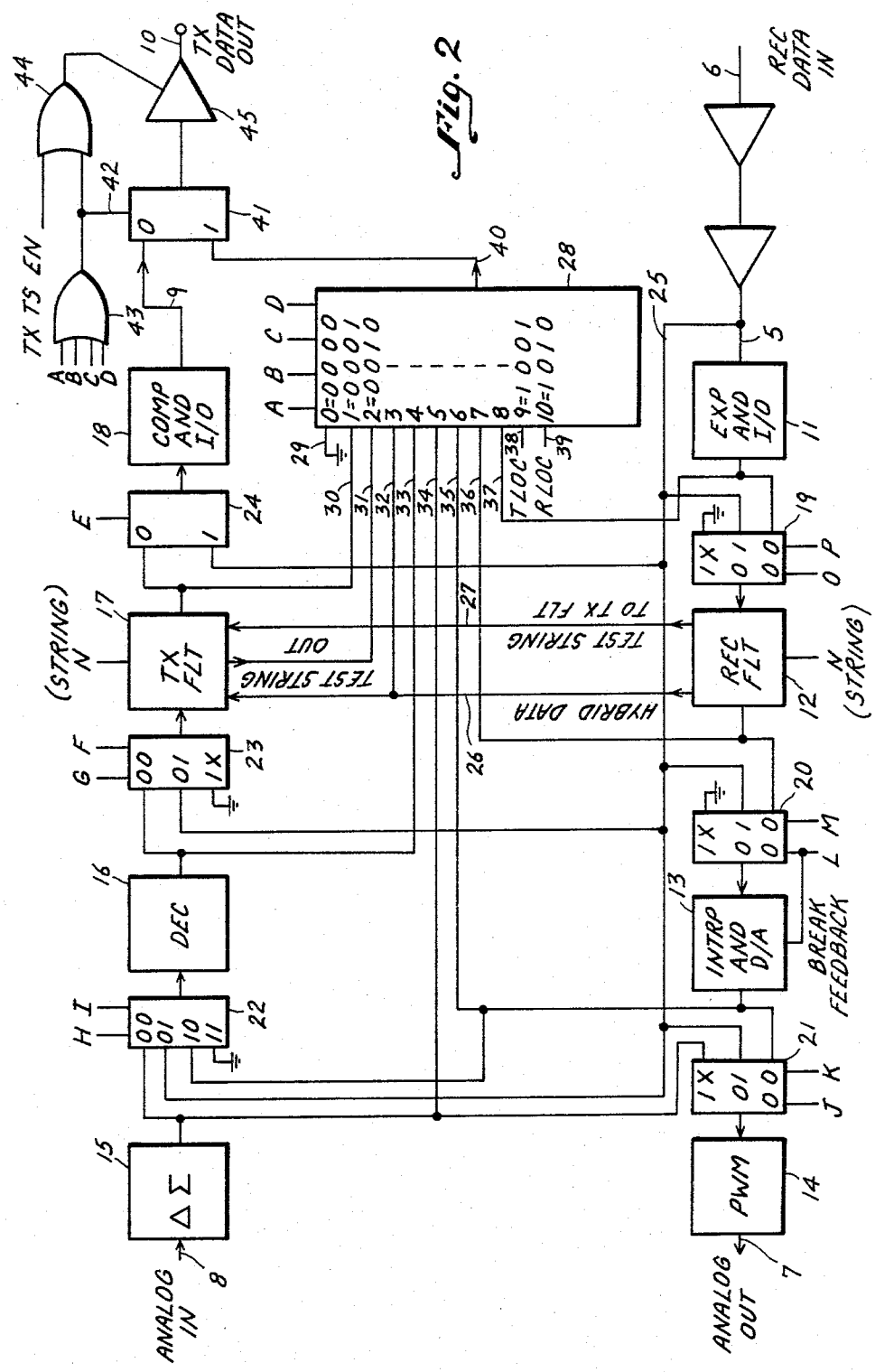
FIG. 2 is a block diagram of the operating and testing circuitry incorporated on each of the coding and decoding arrangements of FIG. 1.

Details of the operating and testing circuitry will become apparent from and will now be discussed in connection with FIG. 2 of the drawing. A first path 5 for incoming or received signals or data is formed by respective electrical connections leading from an incoming digital line 6 to an analog output line 7 connected to the subscriber line. On the other hand, output signals propagating through an analog input line 8 connected to the subscriber line enter and pass through a second path 9 for outgoing signals to eventually reach an outgoing digital line 10.

Signal processing components including an expanding and input/output unit 11, a receive filter and gain device 12, an interpolator and digital-to-analog converter device 13, and a pulse width modulator device 14 are interposed in the first path 5. Another set of signal processing components including a delta sigma modulator or other appropriate analog-to-digital converter device 15, a decimator device 16, a transmit filter and gain device 17 and a compressor and input/output unit 18 is interposed in the second path 9. Separate multiplexers 19, 20, 21, 22, 23 and 24 are respectively arranged in the first path 5 and in the second path 9 ahead of the receive filter and gain device 12, the interpolator and digital-to-analog converter device 13, the pulse width modulator device 14, the decimator device 16, the transmit filter and gain device 17, and the compressor and input/output unit 18. A testing line or path 25 branches off from the first path 5 ahead of the expansion and input/output unit 11 and is connected to each of the multiplexers 19, 20, 21, 22, 23 and 24 to supply the incoming signals from the digital line 6 thereto. The multiplexers 19, 20, 21, 22, 23 and 24 have controlling inputs O, P; L, M; J, K; H, I; G, F; and E, respectively. The multiplexers 19, 20, 22 and 23 also have grounded inputs. The control inputs E to P are selectively supplied with the low and high voltage levels representative of binary "zero" and "one", so that they can act as switches which selectively connect one of the inputs of the respective multiplexer 19 to 24 to its output which is connected to the respective associated component 12 to 14 and 16 to 18. In this manner, it is possible to selectively include the components 12 to 18 in, or exclude the same from, testing signal transmission routes leading through, between, or past sections of the first and second paths 5 and 9 and/or sections of the testing path 25. In this manner, the internal configuration of the coding and decoding arrangement or codec 1 can be altered in order to allow easier testing of the codec 1 that is preferably made by resorting to LSI techniques. The multiplexers 19 to 24 and 16 to 18 allow connections to be made via program control to easily clear, or initialize, a block via the external access pins REC DATA IN, TX DATA OUT. A smaller test word can exercise the logic on a block basis more efficiently than a huge word intended to test all of the codec 1 at once.

The receive filter and gain device 12 and the transmitter filter and gain device 17 are further connected with one another by a connection line 26 which carries hybrid data information and by another connection line 27 which carries a test string information from the receive filter and gain device 12 to the transmitter filter and gain device 17. The signal propagating through the connection line 26 carries information as to the properties of the incoming digital signal passing through the receive filter and gain device 12. This information is modified in a known manner by multiplying the same by hybrid coefficients, and the thus modified information is then combined in the transmit filter and gain device 17 with the digital signals propagating in the second path 9 to at least suppress if not eliminate the effect of echo response to the signals propagating in the first path 5 and through the subscriber line on the signals appearing in the second path 9. For details of this type of digital hybrid arrangement, reference may be had, for instance, to the copending commonly assigned application Ser. No. 485,987, filed on Apr. 18, 1983.

A further advantage of the above construction that is particularly useful when the codec 1 is provided on a single substrate, for instance, by using LSI fabricating procedures, is that the presence of the testing path 25 and the multiplexers 19 to 24 provided internally of the codec 1 renders it possible to gain access to points of the paths 5 and 9 at which the digital signals appear or are to appear at a sample rate of 32 kHz. This may be useful for various applications. So, for instance, access to the output of the decimator device 16 and to the input of the interpolator and digital-to-analog converter device 13 can be used for employing these components 16 and 13 as stand-alone A/D and D/A converters without channel filtering. Also, by being able directly to access points immediately upstream of the receive filter and gain device 12 and immediately downstream of the transmit filter and gain device 17, the initial set-up of the codec 1 can be simplified in that the components 11 and 18 can be bypassed with attendant elimination of the effect of these components 11 and 18 on test pulses during the setting-up operation. Moreover, the test mulitplexers 19 to 24 can also be used for forming a digital loopback at the analog-to-digital interface in that the output of the interpolator and digital-to-analog converter device 13 which otherwise controls the operation of the pulse width modulator device 14 is fed to the decimator device 16. Thus, a digital input on the REC input pin can go all the way around the codec 1 and back out of the TX side for functional testing.

The codec 1 has internal PLL circuits which have not been shown. These circuits can be accessed by looking at either TLOC or RLOC outputs. When the loop is in lock, there is a synchronous relationship between the external frame sync and the internal frame sync. The LOC signals EX-OR these two signals for external loop analysis.

All of the above features are accessed via address OE hex in a control section which will be discussed later.

The arrangement 1 further includes another multiplexer 28 which has four control inputs respectively identified as A, B, C and D. The multiplexer 28 has a grounded input 29, further inputs 30 to 37 respectively connected to the outputs of the signal processing components 17, 12, 16, 15, 13, 12 and 11, and inputs 38 and 39 receiving the TLOC and RLOC signals that indicate the time slots for the received and transmitted signals.

The multiplexer 28 has an output 40 which is connected to one input of an additional or mode-select multiplexer 41. Depending on the particular combination of low and high voltage levels representative of binary "zeros" and "ones" applied to the control inputs A, B, C and D, selected one of the data inputs 29 to 39 will be connected through the multiplexer 28 to the output 40 and thus the pertinent information will be supplied to the mode-select multiplexer 41. The second path 9 is connected to another input of the mode-select multiplexer 41. The mode-select multiplexer 41 is operative for switching between the inputs 40 and 9 for connecting one or the other to the digital output line 10. The operation of the mode-select multiplexer 41 is controlled by an input 42 which receives a signal from an OR gate 43 that has four inputs receiving the voltage levels simultaneously appearing at the inputs A, B, C and D of the multiplexer 28. As shown, when any of the voltage levels of the signals A, B, C and D is high, the mode-select multiplexer 41 will establish connection between the output 40 of the multiplexer 28 and the digital line 10. Hence, the mode-select multiplexer 41 is in its testing mode and test data will issue therefrom onto the output line 10. Only when all of the signal levels A, B, C and D are low is the connection between the output 40 and line 10 interrupted and connection between the second path 9 and the output line 10 established. Then, the processed outgoing digital signals from the second path 9 will reach the digital line 10 and the arrangement 1 is operated in its normal operational mode. The OR gate 43 also controls another OR gate 44 that is also controlled by a transmit time slot enable signal. When either one of these control signals is in its high state, the output signal from the OR gate 44 will close a switching arrangement 45 and the outgoing digital signals will be able to propagate onto the output line 10.

Figure 3:
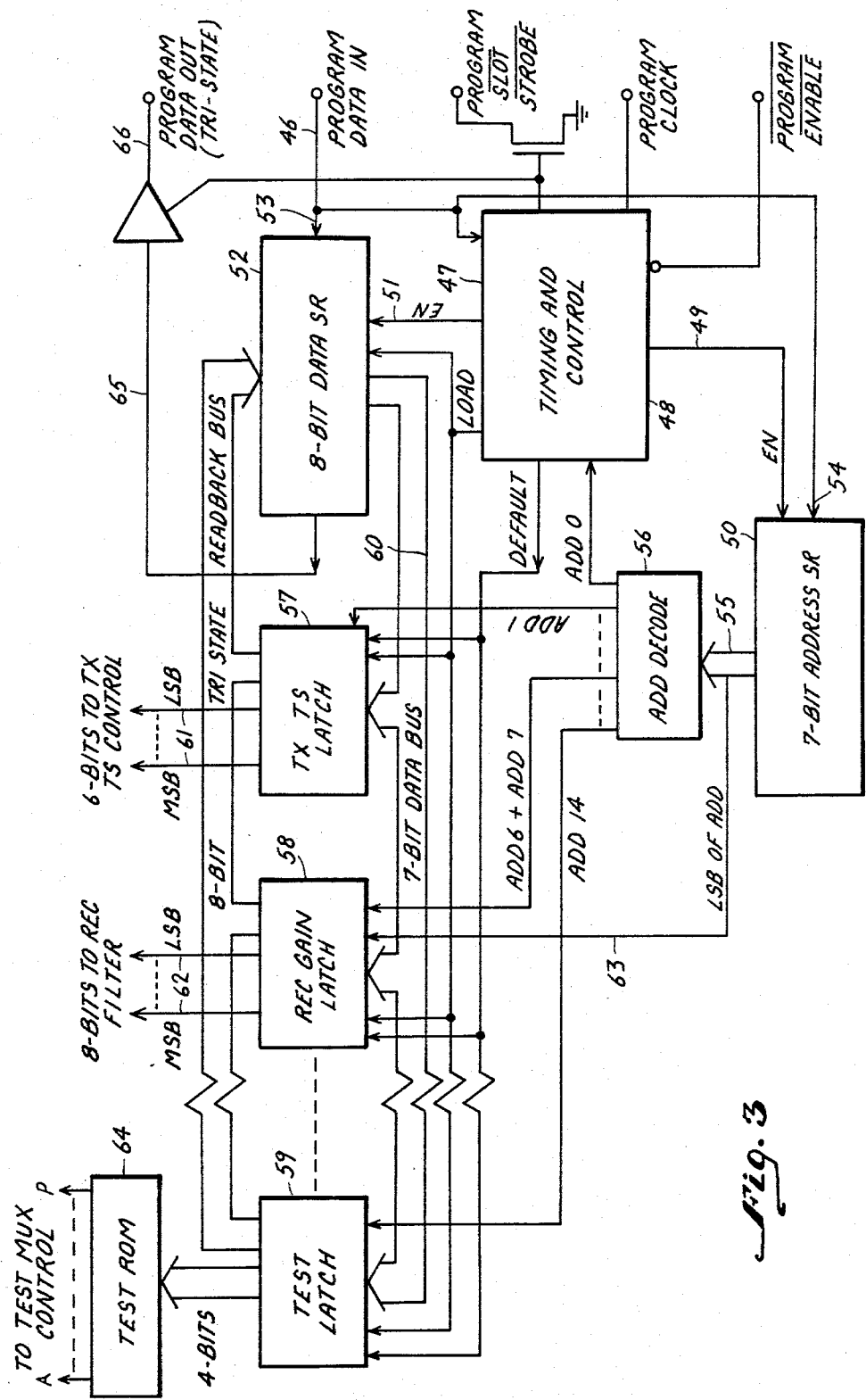
FIG. 3 is a block diagram of a programming section for each of the coding and decoding arrangements of FIG. 1.

Turning now to FIG. 3 of the drawing, it may be seen that it depicts a programming or control section of the coding and decoding arrangement 1. A programmed incoming digital data stream, which appears at the input line 46 of the programming section and which originated at the data output of the shift register 3 of FIG. 1, proceeds to an input 47 of a timing and control circuit 48. The incoming signal at the input 47 may be either address or control data, each in the form of an 8-bit word. The crucial difference between these two types of words is that the most significant bit in each of the address words is a binary "zero", and the most significant bit of every data word is always a binary "one". Depending on whether the timing and control circuit 48 perceives the most significant bit of the incoming word at the input 47 to be a "zero" or a "one", it will issue a loading signal either into a connecting line 49 which enables a 7-bit address shift register 50, or into a connecting line 51 which enables an 8-bit data shift register 52. Respective inputs 53 and 54 of the shift registers 52 and 50 are connected with the input 46 of the programming section, so that the incoming bit stream following the most significant bit is serially loaded either into the address shift register 50 or into the data shift register 52, depending on whether the incoming bit stream falls into the category of addresses or into the category of data.

The address shift register 50 has an output 55 which leads to an input of an address decoder 56. The address decoder has a plurality of control outputs which lead to respective control inputs of a plurality of different latches, of which only a transmit time slot latch 57, a receiver gain latch 58 and a test latch 59 have been particularly shown. The operation of all other latches will be analogous to that of the equivalent latches 57 and 58 so that they have been omitted from the drawing and detailed description thereof may be dispensed with. Another output of the address decoder 56 leads to a control input of the timing and control circuit 48. The signals at the control inputs of the latches 57 to 59 enable, at any given time, only that of the latches 57 to 59 which is being addressed while the remaining latches are disabled. Then, the circuitry waits for the appearance of a next 8-bit word at the programming section input 46. This next word, in most instances, is a data word containing information, for instance, for setting the coefficients of the various filters or timing information for the selection of the time slot for the receive or transmit signals. When this data word arrives, as indicated by a leading "one", the bits following the most significant bit of the word are serially set into the shift register 52. Then, the timing and control circuit 48 issues a load command to the latches 57 to 59 and the information stored in the data shift register 52 is issued into a 7-bit data bus 60. While this data is supplied to each of the latches 57 to 59, only that of the latches 57 to 59 which is enabled by the signal from the address decoder 58 is loaded with the 7-bit data word. Each of the latches 57 and 58 has a plurality of output leads 61 and 62, respectively, which lead to the respective components to be controlled, in the illustrated situation to the time slot control logic (not shown) and to the receive filter and gain device 12 of FIG. 2, respectively. The information carried by the output leads 62 determines the coefficients of the filter and gain device 12.

The data bus 60 carries only a 7-bit word, but an 8-bit word is needed for setting the gain of the receive filter and gain device 12. To supply the missing most significant bit of data, the receive gain latch 58 is assigned two addresses which differ only in the least significant bit of the address. Then, the least significant bit of the address is supplied, through a lead 63, to the receive gain latch 58 so that, when the latter is enabled, this least significant bit of the address will constitute the least significant bit of the data.

The significance of the various bits of the addresses and data will become apparent from Table 1 which is a codec control map.

TABLE 1

| ADDRESS | DATA | READBACK |
|---|---|---|
| $A_7$ $A_6$ $A_5$ $A_4$ $A_3$ $A_2$ $A_1$ $A_0$ (Default See Note*) | $D_7$ $D_6$ $D_5$ $D_4$ $D_3$ $D_2$ $D_1$ $D_0$ | (if other than same) Indicates pwr condition and |
| 0 0 0 0 0 0 0 0 | 1 \|Pwr Dn.\| Time Slot | TX TS. TX=Rec. if defaulted |
| 0 0 0 0 0 0 0 1 | 1 \|X\| Tx Time Slot | X \|Pwr Dwn\| TX Time Slot |
| 0 0 0 0 0 0 1 0 | 1 \|X\| Rec Time Slot | |

TABLE 1-continued

| ADDRESS | DATA | READBACK |
|---|---|---|
| $A_7$ $A_6$ $A_5$ $A_4$ $A_3$ $A_2$ $A_1$ $A_0$ (Default See Note*) | $D_7$ $D_6$ $D_5$ $D_4$ $D_3$ $D_2$ $D_1$ $D_0$ | (if other than same) Indicates pwr condition and |
| 0 0 0 0 0 0 0 0 | \|Pwr Dn.\| Time Slot | TX TS. TX=Rec. if defaulted |
| 0 0 0 0 0 0 1 1 | 1 \|Ext PLL\|Sync/ASYNC\|$C_2C_1$\|Word Length\| | |
| 0 0 0 0 0 1 0 0 | 1 \| Tx Gain(LSB=0) | Reads entire 8 bit Tx Gain |
| 0 0 0 0 0 1 0 1 | 1 \| Tx Gain(LSB=1) | setting back for either address |
| 0 0 0 0 0 1 1 0 | 1 \| Rec Gain(LSB=0) | Reads entire 8 bit Rec Gain |
| 0 0 0 0 0 1 1 1 | 1 \| Rec Gain(LSB=1) | setting back for either address |
| 0 0 0 0 1 0 0 0 | 1 \|X\| Rec Scale Tx Scale OLY | |
| 0 0 0 0 1 0 0 1 | 1 \|X\| MOD\| Hybd Hybrid ON On/Off Coef. A | |
| 0 0 0 0 1 0 1 0 | 1 \|X\|X\|X\| Hybrid Coef. B | 4 MSB 4 LSB Hy Coef C Hy Coef B |
| 0 0 0 0 1 0 1 1 | 1 \|X\|X\|X\| Hybrid Coef. C | Hy Coef C H Coef B |
| 0 0 0 0 1 1 0 0 | Power Down | Reads back same as address |
| 0 0 0 0 1 1 0 1 | Power Up | 0000000. Bit 6 indicates power up=power down=1 |
| 0 0 0 0 1 1 1 0 | 1 Test | |
| 0 0 0 0 1 1 1 1 | | |
| ↑ | | |
| ↓ | Do Nothing | Random Data |
| 0 1 1 1 1 1 1 1 | | |

*Default Note:
An address of all zeroes can either be direct or inferred. A direct address of zero causes all codec functions to default. Power down occurs when the programming data input goes to all ones. An inferred address zero occurs whenever two consecutive data bytes are enabled into the codec. In this mode all functions but time slot are defaulted. Both Tx and Rec are = and controlled as shown above.

When the test latch 59 is enabled, four least significant bits of the 7-bit data word supplied to the test latch 59 by the data bus 60 are transmitted, in parallel form, to a test read-only-memory (ROM) 64 which has outputs A to P which correspond to the control inputs A to P of the multiplexers 28, 24, 23, 22, 21, 20 and 19, in that order. The test ROM 64 has a plurality of memory locations which are selectively addressed by the four bits supplied by the test latch 59 to the test ROM 64. The bits stored in the various locations of the test ROM 64 are shown in Table 2, which also correlates the respective 16-bit words stored in the individual memory locations of the test ROM 64 with the components of the coding and decoding arrangement 1 as shown in FIG. 2 which are being tested, by indicating which of the inputs A to P of the multiplexers 19 to 24 and 28 are activated and which are not.

TABLE 2

| INPUT | OUTPUT (MUX Control) | | | | | | | | | | | | | | | | Test Configuration |
|---|---|---|---|---|---|---|---|---|---|---|---|---|---|---|---|---|---|
| | A | B | C | D | E | F | G | H | I | J | K | L | M | N | O | P | |
| 0 0 0 0 | 0 | 0 | 0 | 0 | 0 | 0 | 0 | 0 | 0 | 0 | 0 | 0 | 0 | 0 | 0 | 0 | Normal |
| 0 0 0 1 | 0 | 0 | 1 | 0 | 0 | 0 | 0 | 1 | 1 | 0 | 0 | 1 | 0 | 1 | 0 | 1 | Filter String |
| 0 0 1 0 | 0 | 0 | 0 | 1 | 0 | 1 | 0 | 1 | 1 | 0 | 0 | 1 | 0 | 0 | 0 | 1 | TX Filter |
| 0 0 1 1 | 0 | 1 | 1 | 1 | 0 | 1 | 0 | 1 | 1 | 0 | 0 | 1 | 0 | 0 | 0 | 1 | Rec Filter |
| 0 1 0 0 | 0 | 0 | 1 | 1 | 0 | 1 | 0 | 1 | 1 | 0 | 0 | 1 | 0 | 0 | 0 | 1 | Hybrid |
| 0 1 0 1 | 0 | 1 | 1 | 0 | 0 | 0 | 1 | 1 | 1 | 0 | 0 | 0 | 1 | 0 | 1 | 0 | Interpolator |
| 0 1 1 0 | 0 | 1 | 0 | 0 | 0 | 0 | 1 | 0 | 1 | 0 | 0 | 0 | 0 | 0 | 1 | 0 | Decimator |
| 0 1 1 1 | 1 | 0 | 0 | 0 | 0 | 0 | 1 | 0 | 0 | 0 | 0 | 0 | 0 | 0 | 1 | 0 | Exp/Rec I/o In Linear |
| 1 0 0 0 | 0 | 0 | 0 | 0 | 1 | 0 | 1 | 0 | 0 | 0 | 0 | 0 | 0 | 0 | 1 | 0 | Comp. TX I/o In Linear |
| 1 0 0 1 | 0 | 1 | 0 | 0 | 0 | 0 | 0 | 0 | 0 | 0 | 0 | 1 | 0 | 0 | 0 | 0 | 32 KHz Access |
| 1 0 1 0 | 0 | 0 | 0 | 0 | 0 | 0 | 1 | 0 | 1 | 0 | 0 | 0 | 0 | 0 | 0 | 0 | Loop at A-D Interface |
| 1 0 1 1 | 0 | 1 | 0 | 1 | 0 | 0 | 0 | 0 | 0 | 0 | 1 | 0 | 0 | 0 | 0 | 0 | Δ Σ Out, PWM In |
| 1 1 0 0 | 1 | 0 | 0 | 1 | 0 | 0 | 0 | 0 | 0 | 0 | 0 | 0 | 0 | 0 | 0 | 0 | TX PLL (T LOC) |
| 1 1 0 1 | 1 | 0 | 1 | 0 | 0 | 0 | 0 | 0 | 0 | 0 | 0 | 0 | 0 | 0 | 0 | 0 | Rec PLL (R LOC) |

It may also be seen in FIG. 3 that the contents of the data shift register 52 may be shifted out into a line 65 leading into an output 66. In this manner, the contents of the data shift register 52 may be read for verification purposes or the like. It may also be seen that a tri-state read back bus 67 lead from the latches 57 to 59 to the data shift register 52. In this manner, the previous or current contents of the respective enabled latches 57 to 59 can be read at the output 66 of the programming section.

Returning now to FIG. 1 of the drawing, it may be seen that the shift register 3 has a plurality of bidirectional inputs/outputs designated as D/Q0 to D/Q7. In this manner, the shift register 3 is in communication with and controlled by a non-illustated microprocessor via an associated data bus. It goes well beyond the scope of the present disclosure to describe how the non-illustrated microprocessor sets up the test routine and how it selects the various coefficients, such as the time slot for receive and transmit channels, the optimum gain of the receive and transmit filter devices, the proper value of the coefficient for the hybrid connection between the receive and transmit filter devices and so on. The criteria for selecting these parameters are well known to those active in the field of telephony so that they need not be described here.

While I have described above the principles of my invention in connection with specific apparatus, it is to be clearly understood that this description is made only by way of example and not as a limitation to the scope of my invention as set forth in the accompanying claims.

We claim:

1. A digital signal processing arrangement, comprising:
   at least one communication path for digital communication signals;
   signal processing means including a plurality of testable components interposed in respective sections of said communication path and each operative for processing digital signals passing therethrough;
   at least one testing path connected to the respective section of said communication path at a juncture and bypassing at least one of said components;
   at least one switching means interposed between the respective section of said communication path, the testing path, and the remainder of said communication path at a location situated at the opposite side of said one component from said juncture as considered in the direction of propagation of digital signals and operative for selectively connecting said remainder of said communication path with said section of said communication path in one switching position and with said testing path in another switching position thereof; and
   means for so controlling the operation of said switching means as to cause said switching means to temporarily assume said other switching position thereof during testing of the performance of said signal processing means to thereby provide at least one testing route bypassing said one component via said testing path for the signal processing means to process digital signals passing therethrough for subsequent evaluation to the exclusion of said one component.

2. The arrangement as defined in claim 1, wherein said switching means includes a plurality of multiplexers each arranged ahead of a different one of said components and having an output connected to the latter, a plurality of data inputs respectively connected at least to said section of said communication path and to said testing path, respectively, and at least one control input operative for controlling the connections between said data inputs and said output of the respective multiplexer in dependence on the value of control potential applied thereto; and wherein said controlling means includes means for applying selected potentials to said control inputs of said multiplexers.

3. The arrangement as defined in claim 2, wherein one of said data inputs of at least some of said multiplexers is connected to the ground.

4. The arrangement as defined in claim 2, wherein said applying means includes a test memory having a plurality of memory locations with different addresses each storing a different combination of binary numbers, and including a plurality of addressing inputs for selectively addressing said memory locations and a plurality of outputs respectively connected to said control inputs of said multiplexers for applying the respective binary numbers of the combination stored at the selected addressed memory location as said potentials to the associated control inputs of said multiplexers, and means for supplying selected addresses to said addressing inputs of said test memory.

5. The arrangement as defined in claim 4, wherein said test memory is a read-only memory.

6. The arrangement as defined in claim 4, wherein said supplying means includes a data storage capable of storing data indicative of the address of the memory location to be addressed and having a plurality of parallel data outputs, and a data bus connecting said data outputs of said data storage with said addressing inputs of said test memory.

7. The arrangement as defined in claim 6, wherein said supplying means further includes a test latch interposed in said data bus between said outputs of said data storage and said addressing inputs of said test memory and having a load input operative for enabling said test latch for receiving data from said data bus when active, and means for rendering said load input of said test latch active when said test latch is to be loaded.

8. The arrangement as defined in claim 7, wherein said rendering means includes a timing and control circuit responsive to incoming signals.

9. The arrangement as defined in claim 8, wherein said test latch further includes an enable input operative for disabling said test latch unless activated; and wherein said supplying means further includes means for activating at least said enable input of said test latch when said test latch is to be loaded during the activation of said load input thereof for receiving said data from said data bus.

10. The arrangement as defined in claim 9, wherein said activating means includes an address storage capable of storing at least one additional address assigned to said test latch, and an address decoder arranged between said address storage and at least said enable input of said test latch and operative for activating said enable input in response to the appearance of said additional address in said address storage.

11. The arrangement as defined in claim 10, and further including at least one additional latch operative for modifying the operation of a selected one of said components and having a different additional address assigned thereto, said additional latch being interposed between said data bus and said selected component in a similar manner as said test latch and having its own load input operated simultaneously with said load input of said test latch, and its own enable input connected to said address decoder and activated when the operation of said one component is to be modified in accordance with the data supplied by said address bus.

12. The arrangement as defined in claim 6, and further comprising means for selectively retrieving information from said test route.

13. The arrangement as defined in claim 12, wherein said retrieving means includes an additional multiplexer having a plurality of data inputs respectively connected to said communication path downstream of the various components and a data output, as well as a plurality of control inputs operative for connecting said data inputs to said data output of said additional multiplexer in dependence on their energization; and further comprising means for selectively energizing said control inputs of said additional multiplexer.

14. The arrangement as defined in claim 13, wherein certain of said outputs of said test memory are assigned and connected to the respectively associated control input of said additional multiplexer for applying the respective binary numbers of the combination stored at the selected addressed memory location to the associated control inputs of said additional multiplexer for energizing the same.

15. The arrangement as defined in claim 14, wherein said paths, said signal processing means, testing and said retrieving means are provided on a common chip.

16. A coding and decoding arrangement adapted to be situated between and connected to digital and analog telecommunication lines, comprising:
communication path means including a first path for incoming, and a separate second path for outgoing, digital signals;
first and second signal processing means each including a plurality of testable components interposed in respective sections of said communication path means;
at least one testing path connected to the respective section of said communication path means at a juncture and bypassing at least one of said components;
at least one switching means interposed in one of said first and second paths between the respective section of said communication path means, the testing path, and the remainder of said communication path means at a location situated at the opposite side of said one component from said juncture as considered in the direction of propagation of the respective incoming and outgoing digital signals in said first and second paths and operative for selectively connecting said remainder of said communication path means with said section of said communication path means in one switching position and with said testing path in another switching position thereof; and
means for so controlling the operation of said switching means as to cause said switching means to temporarily assume said other switching position thereof during testing of the performance of said signal processing means to thereby provide at least one testing route bypassing said one component via said testing path for the signal processing means to process digital signals passing therethrough for subsequent evaluation to the exclusion of said one component.

\* \* \* \* \*